(12) United States Patent
Ansari et al.

(10) Patent No.: US 10,845,943 B1
(45) Date of Patent: Nov. 24, 2020

(54) SYSTEMS AND METHODS FOR GENERATING A 360-DEGREE VIEWING EXPERIENCE

(71) Applicant: CarMax Business Services, LLC, Richmond, VA (US)

(72) Inventors: Omar Ahmed Ansari, Richmond, VA (US); Clark Barrett Jennings, Richmond, VA (US)

(73) Assignee: CARMAX BUSINESS SERVICES, LLC, Richmond, VA (US)

( * ) Notice: Subject to any disclaimer, the term of this patent is extended or adjusted under 35 U.S.C. 154(b) by 0 days.

(21) Appl. No.: 16/790,877

(22) Filed: Feb. 14, 2020

(51) Int. Cl.
| | |
|---|---|
| *G06F 3/00* | (2006.01) |
| *G06F 3/0481* | (2013.01) |
| *G06N 20/00* | (2019.01) |
| *G06N 3/04* | (2006.01) |
| *G06T 7/11* | (2017.01) |
| *G06F 3/01* | (2006.01) |

(52) U.S. Cl.
CPC ....... *G06F 3/04815* (2013.01); *G06N 3/0454* (2013.01); *G06N 20/00* (2019.01); *G06T 7/11* (2017.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2014/0375760 A1* | 12/2014 | Lee | H04N 5/23293 348/36 |
| 2017/0195665 A1* | 7/2017 | Karkkainen | H04N 13/156 |
| 2018/0053280 A1* | 2/2018 | Kim | H04N 5/4403 |
| 2018/0084197 A1* | 3/2018 | Lee | H04N 5/23293 |
| 2018/0109724 A1* | 4/2018 | Kang | G06F 3/04855 |
| 2018/0144520 A1* | 5/2018 | Forutanpour | G06F 3/013 |

(Continued)

OTHER PUBLICATIONS

Ho, T. et al., "Dual-Fisheye Lense Stitching for 360-Degree Imaging," IEEE 2017 International Conference on Acoustics, Speech, and Signal Processing, Mar. 2017 (5 pages).

(Continued)

*Primary Examiner* — Toan H Vu
(74) *Attorney, Agent, or Firm* — Troutman Pepper Hamilton Sanders LLP; Christopher J. Forstner; John A. Morrissett

(57) ABSTRACT

A system for generating a 360-degree viewing experience may receive a plurality of images of an object from an image capture device, wherein each of the plurality of images corresponds to a different rotational orientation of the object relative to the image capture device. The system may detect, using a first machine learning model, the object in each of the plurality of images. The system may detect, using a second machine learning model, regions associated with identifiable object features in one or more images of the plurality of images. The system may assign feature metadata to the one or more images, the features metadata associated with one or more detected regions of the detected regions of the object in the one or more images. The system may publish, with an application programming interface, the plurality of images and the feature metadata for the 360-degree viewing experience.

20 Claims, 9 Drawing Sheets

(56) References Cited

U.S. PATENT DOCUMENTS

2019/0107990 A1* 4/2019 Spivack .................. A63F 13/80
2019/0108578 A1* 4/2019 Spivack .................. G09G 5/14

OTHER PUBLICATIONS

Liu, N. et al., "PiCANet: Learning Pixel-wise Contextual Attention for Saliency Detection," Apr. 3, 2018 (https://arxiv.org/pdf/1708.06433.pdf) (14 pages).

* cited by examiner

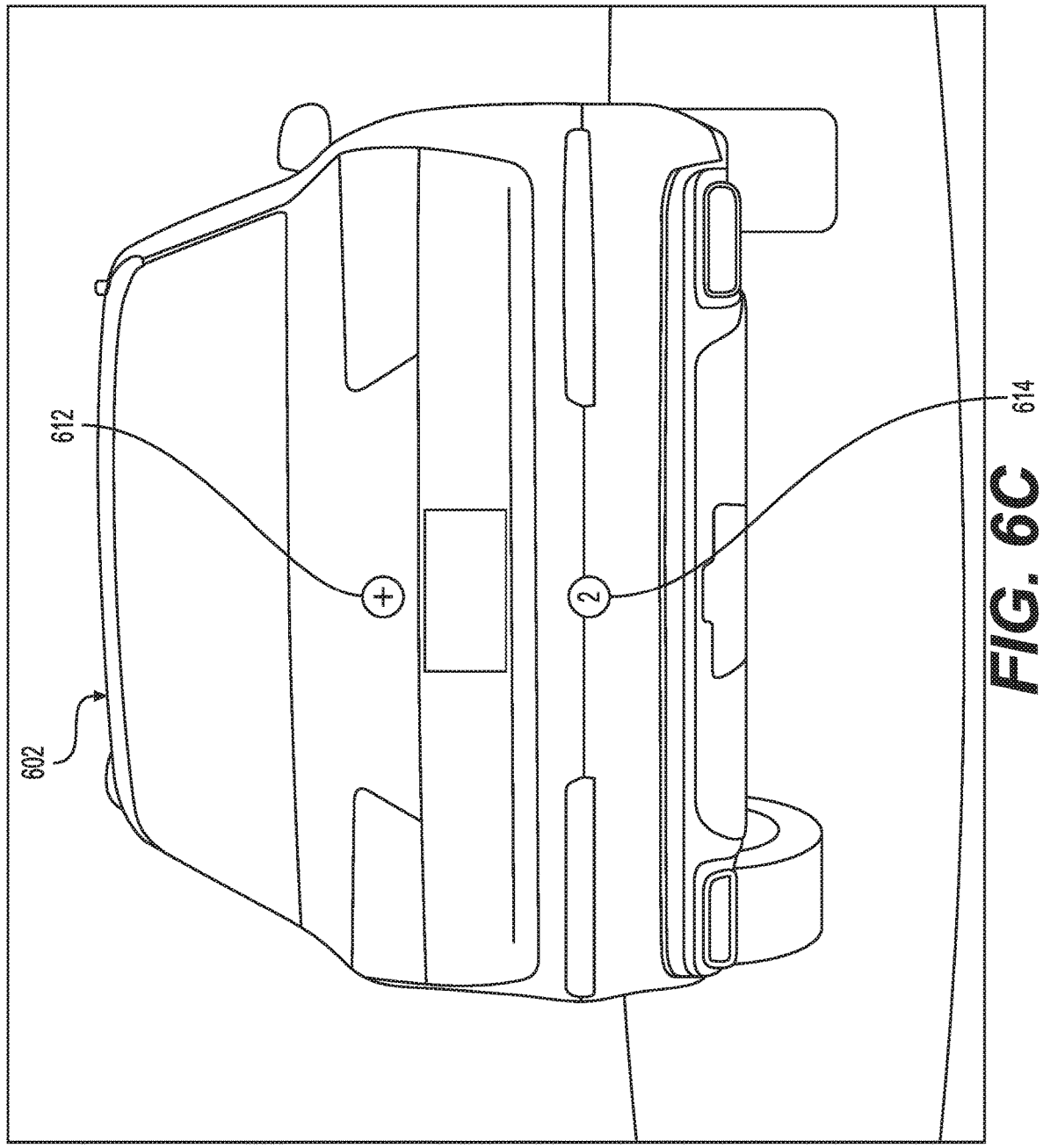

SYSTEMS AND METHODS FOR GENERATING A 360-DEGREE VIEWING EXPERIENCE

FIELD OF THE INVENTION

The present disclosure relates to systems and methods for generating a 360-degree viewing experience, and more particularly systems and methods for generating a 360-degree viewing experience of an object that includes one or more visual indicators assigned to identified regions of the object.

BACKGROUND

As users rely on the Internet more and more for their shopping needs, companies are finding ways to differentiate their products online to convert a customer's view to a sale. Quality images seems to be a main driving factor in converting online views to sales in at least the retail and automotive spaces. Customers want to see all aspects of a product (e.g., a vehicle) including the conditions and features prior to purchasing it or deciding to view it in person. Existing image editing systems tend to require extensive user input that limits the capability of those systems. Indeed, it can be arduous to manually identify and label images of all the features for every product a company has. It can be more challenging to present all aspects of a product (e.g., all sides of a vehicle) in a user-friendly manner.

Accordingly, there is a need for improved systems and methods that generate a 360-degree viewing experience that expedites and automates the manual process of identifying regions of a product and assigning visual indicators to only certain identified regions of a product. Embodiments of the present disclosure are directed to this and other considerations.

SUMMARY

Disclosed embodiments provide systems and methods for generating a 360-degree viewing experience that may include processing for display and displaying a plurality of images that form a 360-degree view of an object.

Consistent with the disclosed embodiments, a system for generating a 360 degree viewing experience may include one or more processors and a memory in communication with the one or more processors and storing instructions that, when executed by the one or more processors, are configured to cause the system to perform the steps of a method to generate a 360-degree viewing experience of an object (e.g., a vehicle). The system may receive a plurality of images of an object from an image capture device, wherein each of the plurality of images corresponds to a different rotational orientation of the object relative to the image capture device. The system may detect, using a first machine learning model (e.g., a trained Faster Region-Based Convolutional Neural Network (Faster R-CNN)), the object in each of the plurality of images. The system may detect, using a second machine learning model (e.g., a trained single shot detector (SSD)), regions associated with identifiable object features in one or more images of the plurality of images. The system may assign feature metadata to the one or more images, the feature metadata associated with one or more detected regions of the detected regions of the object in the one or more images. The system may publish, with an application programming interface, the plurality of images and the feature metadata for the 360-degree viewing experience.

Also consistent with the disclosed embodiments, a system for generating a 360 degree viewing experience may include one or more processors and a memory in communication with the one or more processors and storing instructions that, when executed by the one or more processors, are configured to cause the system to perform the steps of a method to generate a 360-degree viewing experience of an object (e.g., a vehicle). The system may receive a video capturing approximately 360 degrees of an object, split the video into a plurality of images, detect, using a first machine learning model (e.g., a trained Faster Region-Based Convolutional Neural Network (Faster R-CNN)), the object in some of the plurality of images, detect, using a second machine learning model (e.g., a trained single shot detector (SSD)), regions associated with identifiable object features in each of the plurality of images, assign feature metadata to the one or more images, the feature metadata associated with one or more detected regions of the object in the some of the plurality of images, and publish, with an application programming interface, the plurality of images and the feature metadata for the 360-degree viewing experience.

Also consistent with the disclosed embodiments, a system for generating a 360 degree viewing experience of an interior of an object may include one or more processors and a memory in communication with the one or more processors and storing instructions that, when executed by the one or more processors, are configured to cause the system to perform the steps of a method to generate a 360-degree viewing experience of the interior of an object (e.g., a vehicle). The system may receive a 360-degree image of the interior of the object, detect, using a machine learning model, regions of the interior of the object in the 360-degree image, assign feature metadata to at least one image of the plurality of images, the feature metadata associated with one or more detected regions of the interior of the object in the 360-degree image, and publish, with an application programming interface, the 360-degree image and the feature metadata for the 360-degree viewing experience.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various embodiments and aspects of the disclosed technology and, together with the description, serve to explain the principles of the disclosed technology. In the drawings:

FIG. 6C is a diagram depicting a third image of the object with a visual indicator indicating more than one feature.

DETAILED DESCRIPTION

Figure 1:
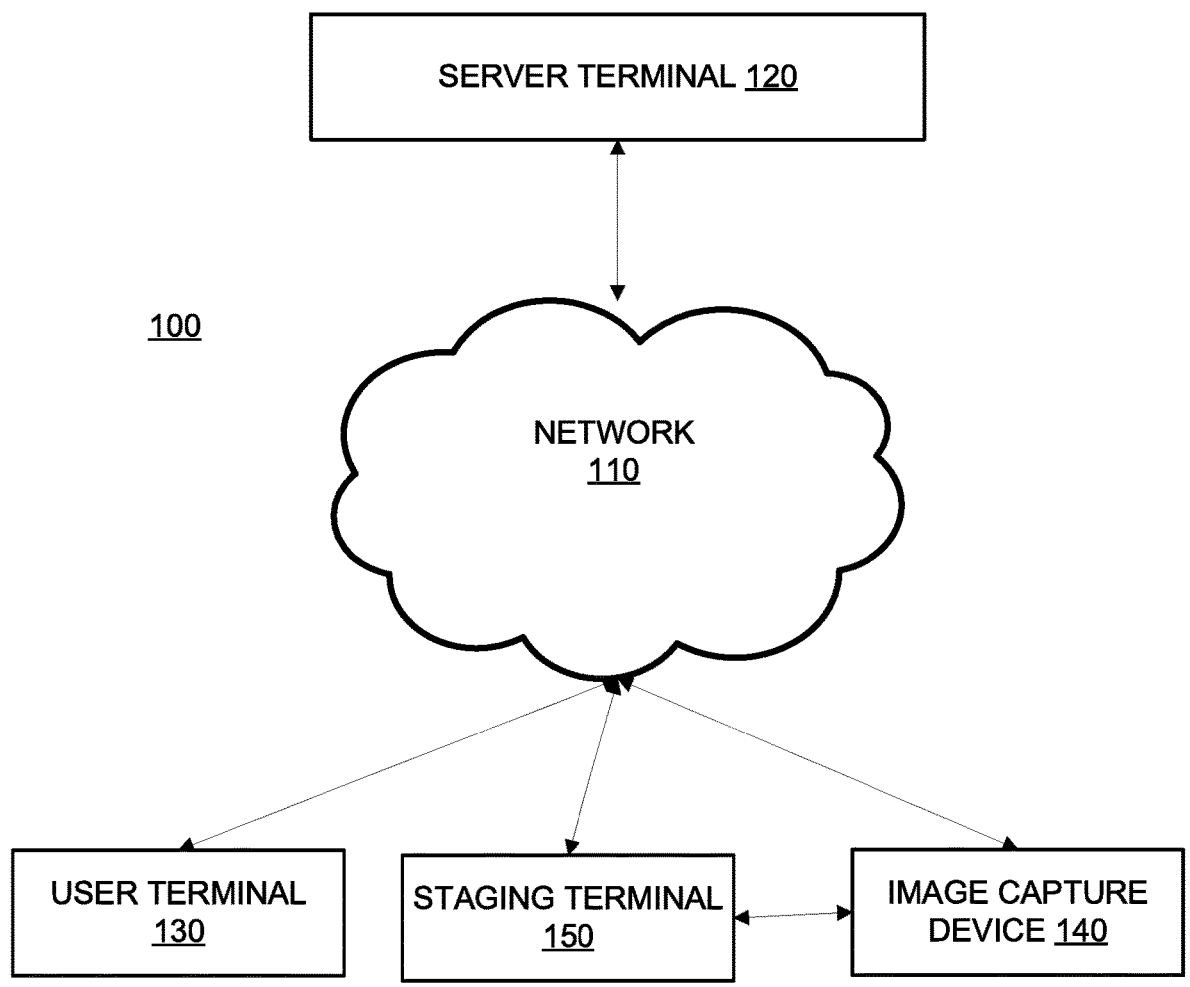
FIG. 1 is a diagram of a system according to an exemplary embodiment of the disclosed technology.

Example embodiments of the disclosed technology can provide systems and methods for generating a 360-degree viewing experience of an exterior of object (e.g., a vehicle) without extensive human input. For example, some embodiments utilize digital image processing techniques and thus enable automated object detection and object region detection for generating a 360-degree viewing experience of the object for display for a user utilizing a viewer on user terminal. According to an aspect, a system for generating a 360 degree viewing experience may include one or more processors and a memory in communication with the one or more processors and storing instructions that, when executed by the one or more processors, are configured to cause the system to perform the steps of a method to generate a 360-degree viewing experience of an object (e.g., a vehicle). The system may receive a plurality of images of an object from an image capture device, wherein each of the plurality of images corresponds to a different rotational orientation of the object relative to the image capture device. The system may detect, using a first machine learning model (e.g., a trained Faster Region-Based Convolutional Neural Network (Faster R-CNN)), the object in each of the plurality of images. The system may detect, using a second machine learning model (e.g., a trained single shot detector (SSD)), regions associated with identifiable object features in one or more images of the plurality of images. The system may assign feature metadata to the one or more images, the feature metadata associated with one or more detected regions of the detected regions of the object in the one or more images of the plurality of images. The system may publish, with an application programming interface, the plurality of images and the feature metadata for the 360-degree viewing experience.

In an embodiment, the first machine learning model includes a first single shot detector (SSD), a first Faster Region-Based Convolutional Neural Network (Faster R-CNN), a Region-Based Fully Convolutional Net (R-FCN), a Mask R-CNN, SegNET, a pixel-wise contextual attention network (PiCANet), or a combination thereof. The second machine learning model includes a You Look Only Once image segmentation model (YOLO), YOLO version 2 (YOLOv2), YOLO9000, RetinaNET, a second Mask R-CNN, a second SSD, or a combination thereof. The object may be a vehicle.

In an embodiment, the feature metadata includes at least one region label and coordinates associated with the one or more detected regions.

In an embodiment, the instructions, when executed by the one or more processors, are further configured to cause the system (e.g., the user terminal running the viewer) to receive a feature list of the object and determine whether a first region label assigned to the one or more detected regions matches a first feature on the feature list beyond a threshold level.

In an embodiment, the instructions, when executed by the one or more processors, are further configured to cause the system (e.g., the user terminal running the viewer) to receive a list of high value features, and determine whether the first feature matches a first high value feature from the list of high value features beyond the threshold level. Responsive to determining that the first region label matches the first feature beyond the threshold level and responsive to determining that the first feature matches the first high value feature beyond the threshold level, generate a visual indicator to be displayed at a center of the detected region based on the coordinates. Responsive to determining that the first region label does not match the first feature beyond the threshold level or that the first feature does not match the first high value feature beyond the threshold level, refrain from generating the visual indicator for display.

In an embodiment, generating the visual indicator includes (i) determining that a series of images of the plurality of images each comprises a common first region, (ii) performing a regression analysis (e.g., a polynomial regression analysis) on a center of the common first region in each of the series of images, (iii) updating the coordinates corresponding to the visual indicator for each of the series of images based on the regression analysis, and (iv) generating the visual indicator for display in each of the series of images at a location based on the updated coordinates.

In an embodiment, the instructions, when executed by the one or more processors, are further configured to cause the system (e.g., via the viewer on the user terminal) to load the plurality of images and the visual indicator and display the plurality of images sequentially to give the appearance of the object rotating about an axis along with the visual indicator In an embodiment, the instructions, when executed by the one or more processors, are further configured to cause the system to crop each of the plurality of images based on the detected object. The displaying of the plurality of images with the visual indicator and the generation of the visual indicator occurs simultaneously.

In an embodiment, the object is rotated into a first rotational orientation position, a second rotational orientation position, and a third rotational orientation position with respect to the image capture device, and the image capture device captures a first image at the first rotational orientation position, a second image at the second rotational orientation position, and a third image at the third rotational orientation position.

In another aspect, a system for generating a 360-degree viewing experience is disclosed. The system for generating a 360 degree viewing experience may include one or more processors and a memory in communication with the one or more processors and storing instructions that, when executed by the one or more processors, are configured to cause the system to perform the steps of a method to generate a 360-degree viewing experience of an object (e.g., a vehicle). The system may receive a video capturing approximately 360 degrees of an object, split the video into a plurality of images, detect, using a first machine learning model (e.g., trained Faster R-CNN), the object in some of the plurality of images, detect, using a second machine learning model (e.g., a trained SSD), regions associated with identifiable object features in one or more images of the plurality of images, assign feature metadata to one or more detected regions of the object in the some of the plurality of images, and publish, with an application programming interface, the plurality of images and the metadata for the 360-degree viewing experience.

In an embodiment, the first machine learning model includes a first single shot detector (SSD), a first Faster Region-Based Convolutional Neural Network (Faster R-CNN), a Region-Based Fully Convolutional Net (R-FCN), a Mask R-CNN, SegNET, a pixel-wise contextual attention network (PiCANet), or a combination thereof. The second machine learning model comprises a You Look Only Once image segmentation model (YOLO), YOLO version 2 (YOLOv2), YOLO9000, RetinaNET, a second Mask R-CNN, a second SSD, or a combination thereof. The object may be a vehicle.

In an embodiment, the feature metadata comprises at least one region label and coordinates associated with the one or more detected regions.

In an embodiment, the instructions, when executed by the one or more processors, are further configured to cause the system to receive a feature list of the object, receive a list of high value features, determine whether a first region label assigned to the one or more detected regions matches a first feature on the feature list beyond a threshold level, and determine whether the first feature matches a first high value feature from the list of high value features beyond the threshold level. Responsive to determining that the first region label matches the first feature beyond the threshold level and responsive to determining that the first feature matches the first high value feature beyond the threshold level, generate a visual indicator for display to a center of the detected region based on the coordinates. Responsive to determining that the first region label does not match the first feature beyond the threshold level or that the first feature does not match the first high value feature beyond the threshold level, refrain from generating the visual indicator for display.

In an embodiment, generating the visual indicator includes (i) determining that a series of images of the plurality of images each comprise a common first region, (ii) performing a regression analysis (e.g., a polynomial regression analysis) on a center of the common first region of the series of images, (iii) updating the coordinates corresponding to the visual indicator for each of the series of images based on the regression analysis, and (iv) generating the visual indicator for display in each of the series of images at a location based on the updated coordinates.

In an embodiment, the instructions, when executed by the one or more processors, are further configured to cause the system (e.g., via the viewer on the user terminal) to load the plurality of images and the visual indicator, display the plurality of images sequentially to give the appearance of the object rotating about an axis along with the visual indicator.

In yet another aspect, a system for generating a 360-degree viewing experience is disclosed. The system for generating a 360 degree viewing experience of an interior of an object may include one or more processors and a memory in communication with the one or more processors and storing instructions that, when executed by the one or more processors, are configured to cause the system to perform the steps of a method to generate a 360-degree viewing experience of the interior of an object (e.g., a vehicle). The system may receive a 360-degree image of the interior of the object, detect, using a machine learning model, regions associated with identifiable object features in the 360-degree image, assign feature metadata to one or more images of the plurality of images, the feature metadata associated with one or more detected regions the 360-degree image, and publish, with an application programming interface, the 360-degree image and the metadata for the 360-degree viewing experience.

In an embodiment, the 360-degree image is formed by stitching together two or more images captured by an image capture device of the interior of the object, and the feature metadata includes at least one region label and Cartesian coordinates associated with the one or more detected regions.

In an embodiment, the instructions, when executed by the one or more processors, are further configured to cause the system (e.g. the user terminal running the viewer) to receive a feature list of the object, receive a list of high value features, determine whether a first detected region of the one or more detected regions matches a first feature on the feature list beyond a threshold level, and determine whether the first feature matches a first high value feature from the list of high value features beyond the threshold level. Responsive to determining that the first detected region matches the first feature beyond the threshold level and responsive to determining that the first feature matches the first high value feature beyond the threshold level, translate the Cartesian coordinates of a center of the detected region to polar coordinates and generate a visual indicator for display at the center of the detected region based on the polar coordinates. Responsive to determining that the first detected region does not match the first feature beyond the threshold level or that the first feature does not match the first high value feature beyond the threshold level, refrain from generating the visual indicator for display.

In an embodiment, the instructions, when executed by the one or more processors, are further configured to cause the system to stretch the 360-degree image into a spherical view.

The exemplary systems, methods, and computer-readable media disclosed herein may provide numerous advantages. Notably, they may function with little user input, and provide image results that are standardized to increase the marketability of the goods, avoid customer confusion about the products being sold, and increase brand and merchant recognition.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a diagram of a system according to an exemplary embodiment of the disclosed technology. The components and arrangements shown in FIG. 1 are not intended to limit the disclosed invention as the components used to implement the disclosed processes and features may vary. In accordance with the disclosed embodiments, a system 100 may include a server terminal 120, which may serve as a central node between other nodes, in communication with a user terminal 130, an image capture device 140, and a staging terminal 150 via a network 110. Although FIG. 1 only illustrates a single server terminal 120, a single user terminal 130, a single staging terminal 150, and a single image capture device 140, it is intended that the disclosed system 100 may include a plurality of server terminals 120, a plurality of user terminals 130, a plurality of image capture devices 140, a plurality of staging terminals 150, or combinations thereof. In some embodiments, user terminal 130 and image capture device 140 may comprise a combined device, such as a mobile computing device with image capture capabilities.

Figure 2:
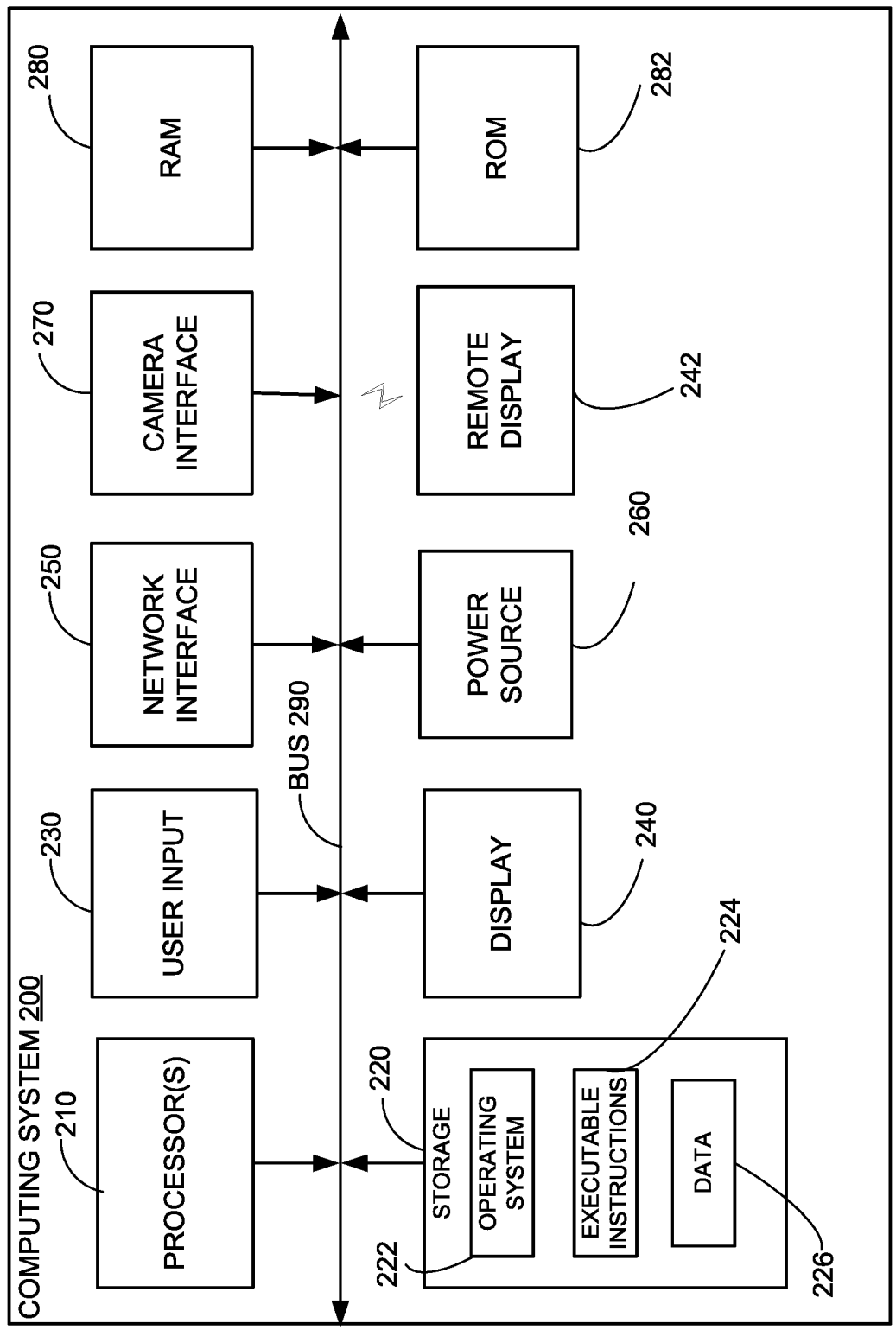
FIG. 2 depicts a computing system architecture according to an exemplary embodiment of the disclosed technology.

Server terminal 120, user terminal 130, and staging terminal may each include one or more mobile computing devices (e.g., tablet computers or portable laptop computers) or stationary computing devices (e.g., stationary desktops), and have components and functionalities as described in more detail with respect to FIG. 2.

Network 110 may be of any suitable type, including individual connections via the internet such as cellular or WiFi™ networks. In some embodiments, network 110 may connect terminals using direct connections such as radiofrequency identification (RFID), near-field communication (NFC), Bluetooth®, low energy Bluetooth® (BLE), WiFi™, ZigBee®, ambient backscatter communications (ABC) protocols, USB, or LAN.

Image capture device 140 may be, for example, a digital camera utilizing either a charge-coupled device (CCD) imager or complimentary metal-oxide semiconductor (CMOS) imager, without limitation. Image capture device 140 may communicate with the user terminal 130, staging terminal 150, and/or server terminal 120 via the network 110. Additionally, or alternatively, the image capture device 140 may communicate with the staging terminal directly (e.g., via a wired connection).

In some embodiments, the 360-degree viewing experience generation methods disclosed herein to be performed in part or entirely by the user terminal 130, staging terminal 150, and server terminal 120. For example, in some embodiments, server terminal 120 or the staging terminal 150 may perform most or all of the image processing steps before publishing a plurality of images with metadata (e.g., bounding box identification data identifying the object in the image and bounding box identification data of detected regions of the object) assigned to each of the plurality of images. Similarly, in other embodiments, user terminal 130 may perform most or all of the image processing steps after receiving or retrieving the plurality of images of the object from the published location from the server terminal 120. In further embodiments, user terminal 130, server terminal 120, and/or the staging terminal may each perform some of the image processing steps. The user terminal 130, server terminal 120, and the staging terminal 150 may comprise more or fewer of the components disclosed in FIG. 2, enabling the user terminal 120, the server terminal 110, and the staging terminal 150 to perform the steps of the disclosed methods.

A computing device architecture 200 is illustrated in FIG. 2, and embodiments of the disclosed technology may include a computing device with more or fewer components than those shown. It will be understood that computing device architecture 200 is provided for example purposes only and does not limit the scope of the various embodiments of the present disclosed systems, methods, and computer-readable mediums.

As shown, computing device architecture 200 may include a central processing unit (CPU) 210, where computer instructions may be processed; a display interface 240 that supports a graphical user interface and provides functions for rendering video, graphics, images, and texts on the display. In certain example embodiments of the disclosed technology, display interface 240 may connect directly to a local display, such as a desktop monitor. Although not shown, in some embodiments, the computing device architecture 200 includes one or more graphics processing units (GPUs) in place of or in addition to the CPU 210. In another example embodiment, display interface 242 may be configured for providing data, images, and other information for an external/remote display that is not necessarily physically connected to the mobile computing device. For example, a desktop monitor may be utilized for mirroring graphics and other information that is requested from remote server. In certain example embodiments, display interface 242 wirelessly communicates, for example, via a Wi-Fi™ channel, Bluetooth™ connection, or other available network connection interface 250 to the external/remote display.

In an example embodiment, network connection interface 250 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, another like communication interface, or any combination thereof.

Computing device architecture 200 may include a user input 230 that provides a communication interface to a physical or virtual keyboard. Computing device architecture 200 may be configured to use one or more input components via one or more of input/output interfaces (for example, keyboard interface 230, display interface 240, network connection interface 250, a camera interface 270, etc.) to allow computing device architecture 200 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, and the like. Additionally, an input component may be integrated with the computing device architecture 200 or may be a separate device.

In example embodiments, network connection interface 250 may support a wireless communication interface to a network (e.g., network 110). As mentioned above, display interface 240 may be in communication with network connection interface 250, for example, to provide information for display on a remote display 242 that is not directly connected or attached to the system. In certain embodiments, camera interface 270 may be provided that acts as a communication interface and provides functions for capturing digital images from a camera. According to example embodiments, a random access memory (RAM) 280 may be provided, where computer instructions and data may be stored in a volatile memory device for processing by the processor(s) 210 or GPU(s).

According to example embodiments, computing device architecture 200 may include a read-only memory (ROM) 282 where invariant low-level system code or data for basic system functions such as basic input and output (I/O), startup, or reception of keystrokes from a keyboard may be stored in a non-volatile memory device. According to example embodiments, computing device architecture 200 may include a storage medium 220 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 222, application programs (including, for example, a web browser application, a widget or gadget engine, and or other applications, as necessary), executable instructions 224 (including stored programs or machine learning models that enable various operations of the disclosed method in e.g., system 300), and data files 226, which may include images and associated metadata. According to example embodiments, computing device architecture 200 may include a power source 260 that may provide an appropriate alternating current (AC) or direct current (DC) to power components.

According to an example embodiment, processor 210 may have appropriate structure to be a computer processor. In one arrangement, processor 210 may include more than one processing unit. RAM 280 may interface with a computer bus 290 to provide quick RAM storage to the processor 210 during the execution of software programs such as the operating system, application programs, and device drivers. More specifically, processor 210 may load computer-executable process steps from storage medium 220 or other media into a field of RAM 280 to execute software programs. Data may be stored in RAM 280, where computer processor 210 may access data during execution. In one example configuration, and as will be understood by one of skill in the art, computing device architecture 200 may include sufficient RAM and flash memory for carrying out processes relating to the disclosed technology.

Storage medium 220 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a solid state drive (SDD), an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to off-load data from the device or to upload data onto the device. A computer program product, such as one utilizing an image cropping system, may be tangibly embodied in storage medium 220, which may include a non-transitory, machine-readable storage medium.

According to example embodiments, the term "computing device," as used herein, may be a processor, or conceptualized as a processor (for example, processor 210 of FIG. 2). In such example embodiments, the computing device (processor) may be coupled, connected, and/or in communication with one or more peripheral devices, such as display 240.

In example embodiments of the disclosed technology, a computing device includes any number of hardware and/or software applications that are executed to facilitate any of the operations. In example embodiments, one or more user input interfaces 230 may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, etc., may facilitate user interaction with the computing device. The one or more user input interfaces 230 may be utilized to receive or collect data and/or user instructions from a wide variety of input devices. Received data may be processed by one or more computer processors 210 as desired in various embodiments of the disclosed technology and/or stored in one or more memory devices, such as storage medium 220.

One or more network interfaces 250 may facilitate connection of the computing device inputs and outputs to one or more suitable networks and/or connections. For example, the connections that facilitate communication with any number of sensors associated with the system. The one or more network interfaces 250 may further facilitate connection to one or more suitable networks; for example, a local area network, a wide area network, the Internet, a Wi-Fi™ enabled network, a satellite-based network, any wired network, any wireless network, etc., for communication with external devices and/or systems.

Figure 3:
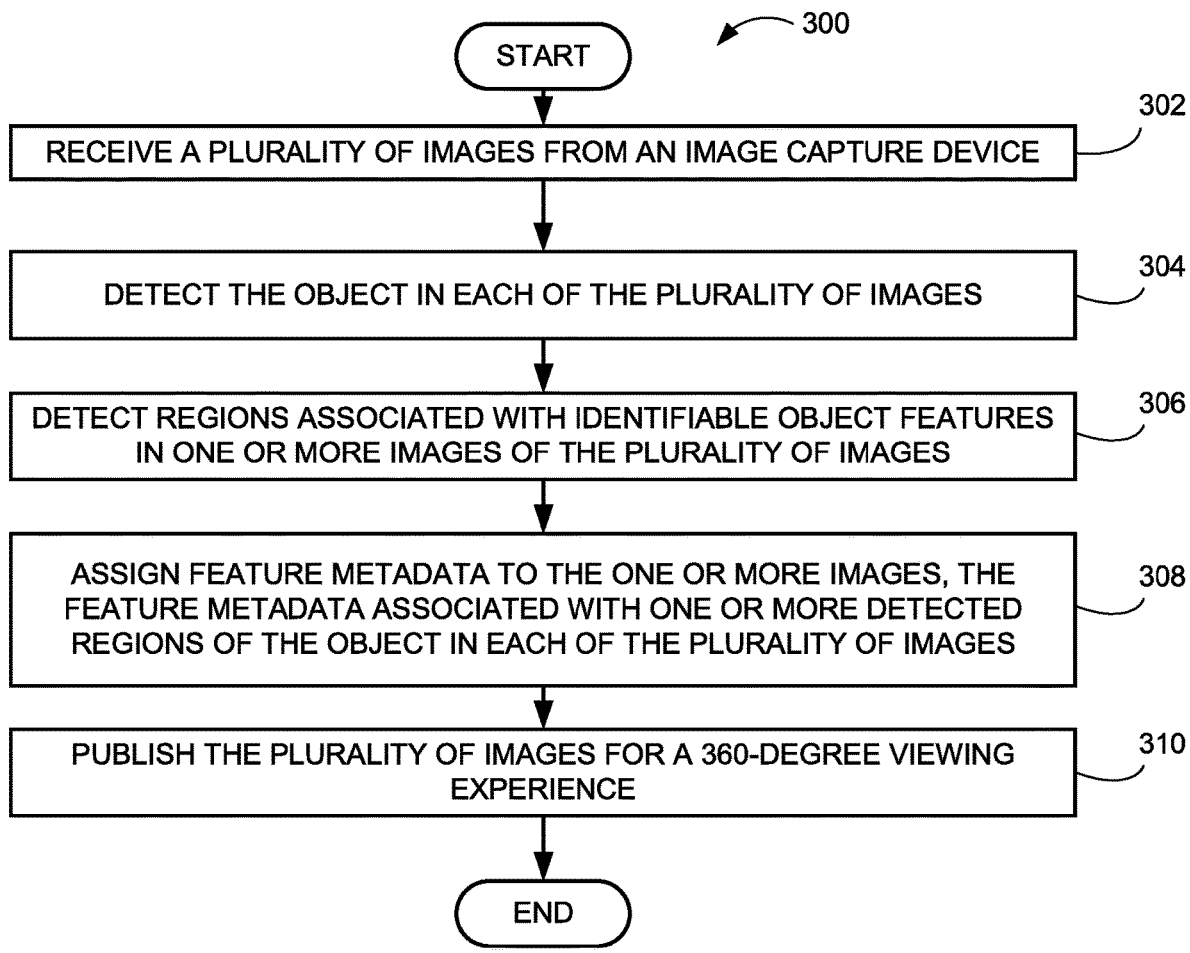
FIG. 3 is a flowchart of an exemplary method for generating a 360-degree viewing experience.

FIG. 3 is a flowchart of an exemplary method 300 for generating a 360-degree viewing experience. The steps of method 300 are described below.

In step 302 of method 300, the system (e.g., system 100 or, more specifically, the server terminal 120, the user terminal 130, the staging terminal 150, or combinations thereof) may receive a plurality of images from an image capture device 140. Each of the plurality of images may be taken from the same point of reference and correspond to a different orientation of the object relative to the image capture device 140. For example, the object (e.g., a vehicle) may be placed on a carousel that rotates the object about a central vertical axis of the carousel 360 degrees, and which the central vertical axis remains fixed in relation to the image capture device 140. Every time the object is moved (e.g., rotated) a specific number of degrees (e.g., 6 degrees), the image capture device 140 may capture an image of the object, and after several fixed rotations about the central vertical axis, thereby capture a plurality of images (e.g., 60 images) of the object. In some embodiments, the carousel and the object stop rotating every certain number of degrees (e.g., 6 degrees) so that the image capture device can capture an image while the object is still. In other embodiments, the carousel and the object rotate continuously as the image capture device 140 captures an image every certain number of degrees (e.g., 6 degrees). In an alternate embodiment, the image capture device 140 captures a video of the object as it and the carousel spin.

In step 304, the system (e.g., system 100 or, more specifically, the server terminal 120, the user terminal 130, the staging terminal 150, or combinations thereof) may detect the object in each of the plurality of images. To do so, the system may utilize a first machine learning model to analyze an image or series of images of an object. The first machine learning model may include a first single shot detector (SSD), a first Faster Region-Based Convolutional Neural Network (Faster R-CNN), a Region-Based Fully Convolutional Net (R-FCN), a Mask R-CNN, SegNET, a pixel-wise contextual attention network (PiCANet), or a combination thereof. In some embodiments, the system, using the first machine learning model, may generate a saliency map of the object where the object is shown in white or gray and background is shown in black. This enables the system to generate coordinates (e.g., Cartesian coordinates) of the digital image corresponding to a bounding box that outlines and separates the detected object from the background in each of the plurality of images. The coordinate of the bounding box may be drawn around using the largest contours in the resulting image. The system stores (e.g., storage 220 of server terminal 120) the coordinates of the bounding box of the object as metadata for each of the plurality of images on an image-by-image basis. The coordinates may include a top location of the image, a left location of the image, a width of the bounding box, and a height of the bounding box, or any other referential location to identify pixels in an image. In other embodiments, the first machine learning model (e.g., Mask R-CNN) may be used to detect the object (e.g., a vehicle) and generate the coordinates (e.g., Cartesian coordinates) corresponding to a bounding box the bounds the object.

In step 306, the system (e.g., system 100 or, more specifically, the server terminal 120, the user terminal 130, the staging terminal 150, or combinations thereof) may detect the regions of the object in one or more images of the plurality of images. To do so, the system may utilize a second machine learning model, which may be different from the first machine learning model or the same as the first machine learning model but trained differently. The second machine learning model may include a You Look Only Once image segmentation model (YOLO), YOLO version 2 (YOLOv2), YOLO9000, RetinaNET, a second Mask R-CNN, a second SSD, or a combination thereof. For each detected region, the system may generate metadata—coordinates (e.g., Cartesian coordinates) on the digital image corresponding to a bounding box that outlines the boundaries of the detected region. The coordinates may include a top location of the image, a left location of the image, a width of the bounding box, and a height of the bounding box, or any other referential location to identify pixels in an image.

In an embodiment the object is a vehicle and the detected regions are exterior parts of the vehicle. For example, a detected region may include, but is not limited to, a headlight, a door, a windshield, a bumper, a tire, a right mirror, a right quarter panel, and a trunk.

In step 308, the system (e.g., system 100 or, more specifically, the server terminal 120, the user terminal 130, the staging terminal 150, or combinations thereof) may assign metadata (e.g., coordinates corresponding to a bounding box that outlines the boundaries of the detected region) to one or more detected regions of the object in the one or more images of the plurality of images. The metadata may include at least one region label(s) (e.g., "tires") and coordinates associated with the one or more detected regions. By assigning the metadata, the system may store (e.g., storage 220 of server terminal 120) the coordinates of the bounding box for each detected region of the object for each of the plurality of images. Other metadata that may be assigned to each of the plurality of images may include an identification, camera make, camera model, employee identification (e.g., an indication of who was responsible for capturing the images), location information (e.g., GPS coordinates of where the images were taking place and/or an identification name or number corresponding to a location), carousel angle (e.g., an angle on a turning carousel the object is positioned relative to the camera), date of capture (e.g., the date the image was captured), date the images were uploaded to the cloud (e.g., server terminal 120), file name, detected regions including the names of the detected regions and the bounding box coordinates of the detected regions, and bounding box coordinates of the object. In some embodiments, the system may also assign a blur score to an image. If the assigned blur score is above a threshold blur level, then the system may stop the process and generate a notification for display to recapture one or more images of the object. In some embodiments, the system may also assign a glare score an image. If the assigned glare score is above a threshold glare level, then the system may stop the process and generate a notification for display to recapture one or more images of the object.

In step 310, the system (e.g., system 100 or, more specifically, the server terminal 120, the user terminal 130, the staging terminal 150, or combinations thereof) may publish the plurality of images and the metadata (e.g., the coordinates of each detected region and/or the coordinates of the detected object) for the 360-degree viewing experience. The 360-degree viewing experience allows a user of a user terminal 130 (e.g., a smartphone, tablet, laptop computer, desktop computer, or a smart television) to rotate the object (e.g., the vehicle) in response to user input and based on the plurality of images. Essentially, the user terminal 130, via the use of an application called a viewer, retrieves the plurality of images, loads the plurality of images, and presents them to a user one image at a time and smoothly switching from one image to the next in response to user input. As will be described further below, the 360-degree viewing experience also includes the use of hotspots that are visual indicators associated with the image in certain locations to indicate certain features of the object such as new tires on a vehicle.

In certain instances, the system 100 (e.g., the user terminal 130) may generate and cause to be displayed a visual indicator to the center of the detected region (e.g., the center of the bounding box of the detected region) of the one or more detected regions in certain instances. For example, the system 100 may be configured to receive a feature list of the object from an application programming interface (API) and receive a list of high value features from an API. The system 100 may be further configured to determine whether a first region label (e.g., front right tire) of the one or more detected regions matches a first feature (e.g., front right tire) on the feature list beyond a threshold level and determine whether the first feature matches a first high value feature (e.g., new tires) from the list of high value features beyond the threshold level. In response to determining that the first detected region matches the first feature beyond the threshold level (e.g., 30% or above) and to determining that the first feature matches the first high value feature beyond the threshold level (e.g., 30% or above), the system 100 may generate a visual indicator for display at a center of the detected region based on the coordinates. In response to determining that the first region label does not match the first feature beyond the threshold level or that the first feature does not match the first high value feature beyond the threshold level, the system 100 refrain from generating the visual indicator.

The visual indicator may be any visual cue (e.g., a circle, point, a circle with text such as a plus sign, or a circle with a number in it to indicate the number of features it represents) that signifies a feature or region of the object within the corresponding image. The visual indicator may include data (e.g., new tires) from the high value feature list to describe the region of the object (e.g., vehicle). In some embodiments, the visual indicator may be interactive such that a small circle is initially displayed on the center of the detected region based on the coordinates. When the visual indicator is engaged via use input (e.g., clicked on with a mouse or tapped on via a touch screen input), it transforms to display text (e.g., new tires) associated with the particular region of the object (i.e., a hot spot).

It is difficult to generate a visual indicator that has a position (e.g., a vertical position and a horizontal position in an image) that is visually consistent from image to image due to detected regions shifting based on what part of an object is visible. Essentially, when viewing the images, via the 360-degree viewing experience, the generated visual indicators appear to jump or move from image to image while the object (e.g., vehicle) rotates. To help solve for these problems, the system takes into account the center points of corresponding detected regions in images that have the same high value feature and generates a visual indicator for display for that feature in each of the images containing the corresponding detected region. Specifically, generating the visual indicator may include (i) determining that a series of images of the plurality of images each comprise a common first region (e.g., a region label and/or high value feature that is shared by a series of images of the plurality of images), (ii) performing a regression analysis (e.g., polynomial regression) on a center of the common first region in each of the series of images, (iii) updating the coordinates corresponding to the visual indicator for each of the series of images based on the regression analysis, and (iv) generating the visual indicator for display in each of the series of images at a location based on the updated coordinates. The coordinates are previously assigned to the series of images in step 308 and are updated based on the regression analysis (e.g., polynomial regression analysis). In some embodiments, the series of images may include all images with a common detected region. For example, the series of images may include all images in the plurality of images of a vehicle that include a detected front right tire in each of those images.

It is also difficult to generate a visual indicator that has a position (e.g., a vertical position and a horizontal position in an image) that is visually consistent from image to image due to the system failing to detect a region in one or more images. Essentially, when viewing the images, via the 360-degree viewing experience, the visual indicator appears to disappear in an image and reappear in others. In some embodiments, the system 100 may add coordinates for a detected region to a target image that is missing coordinates for the detected region. For example, a target image may have a first neighboring image showing the same object but rotated clockwise a certain number of degrees (e.g., 6 degrees) about a central axis when compared to the target image. The target image may have a second neighboring image showing the same object but rotated counter clockwise a certain number of degrees (e.g., 6 degrees) about a central axis when compared to the target image. Regardless, the system 100 may identify a target image not containing a common detected region found in two adjacent or neighboring images by reviewing the metadata of the target image and the neighboring images. The system 100 may assign the coordinates for a detected region and a visual indicator to the target image based on the coordinates for the detected regions in the adjacent or neighboring images such that the coordinates are used to generate a visual indicator for the target image. In some embodiments, assigning the coordinates for the detected region or visual indicator to the target image may also be based on the regression analysis (e.g., polynomial regression analysis) conducted on the series of images described above.

It is also difficult to generate a visual indicator that has a position (e.g., a vertical position and a horizontal position in an image) that is visually consistent from image to image due to the system failing to generate a visual indicator for an image because the system incorrectly determined that the first region label does not match the first feature beyond a threshold level or that the first feature does not match the first high value feature beyond the threshold level. Essentially, when viewing the images, via the 360-degree viewing experience, the visual indicator appears to disappear in an image and reappear in others. In some embodiments, the system 100 may designate a first region label of a detected region of a target image, corresponding to coordinates, as matching a first feature beyond a threshold level and matching the first high value feature beyond the threshold level. The system 100 may identify a target image not containing a common detected region found in two adjacent or neighboring images by reviewing the metadata of the target image and the neighboring images. The system 100 may then designate the first region label of a detected region of a target image matching a first feature beyond a threshold level and matching the first high value feature beyond the threshold level such that the coordinates already corresponding to the first region label are used to generate a visual indicator for the target image. The system 100 may adjust or update the coordinates for the detected region and a visual indicator based on the previously run regression analysis (e.g., polynomial regression) for the series of images discussed above. Alternatively, system 100 may re-run the regression analysis on the series of images (including the target image, which was not previously included in the series of images) with the common detected region and update the coordinates for the visual indicator based on the regression analysis. Regardless, the system 100 may generate a visual indicator for the target image located at the updated coordinates.

In some embodiments, when the system 100 generates a visual indicator for a target image, it may take into account corresponding detected regions in two neighboring images as well as the detected region for the target image. For example, the system may take the average coordinates of the center point of the detected regions for the three images (two neighboring images and the target image) and the generate a visual indicator to be displayed at that average coordinates in the target image.

The system 100 (e.g., the user terminal 130) may be configured to load the plurality of images and the visual indicator and display the plurality of images sequentially to give the appearance of the object rotating about an axis along with the visual indicator. In an embodiment, the generating of the visual indicator and the displaying of the images with the visual indicator occurs substantially simultaneously.

The system 100 (e.g., the user terminal 130) may be further configured to crop each of the plurality of images based on the detected object in step 304, user input, or both. For example, a user, via user terminal 130 using a viewer, may request via an image API, a particular aspect ratio (e.g. 1/1, 4/3, or 16/9) and/or a particular amount of padding surrounding the detected object to ensure the entire object in the image is captured. In an embodiment, the system dynamically crops each of the plurality of images at different aspect ratios (e.g. 1/1, 4/3, or 16/9), when a user utilizes a viewer on a particular device (e.g., a smart phone) the particular device may request the plurality of images with a 16/9 aspect ratio to view in landscape mode whereas a different device (e.g., a laptop computer) may request the plurality of images with a 4/3 aspect ratio. In an embodiment, the system may add white pixels to meet the aspect ratio if required. In some embodiments, the system may utilize the automatic cropping system and/or methods described in U.S. patent application Ser. No. 15/934,648, entitled Automatic Image Cropping Systems and Methods, filed Mar. 23, 2018, which is incorporated herein by reference in its entirety.

Figure 4:
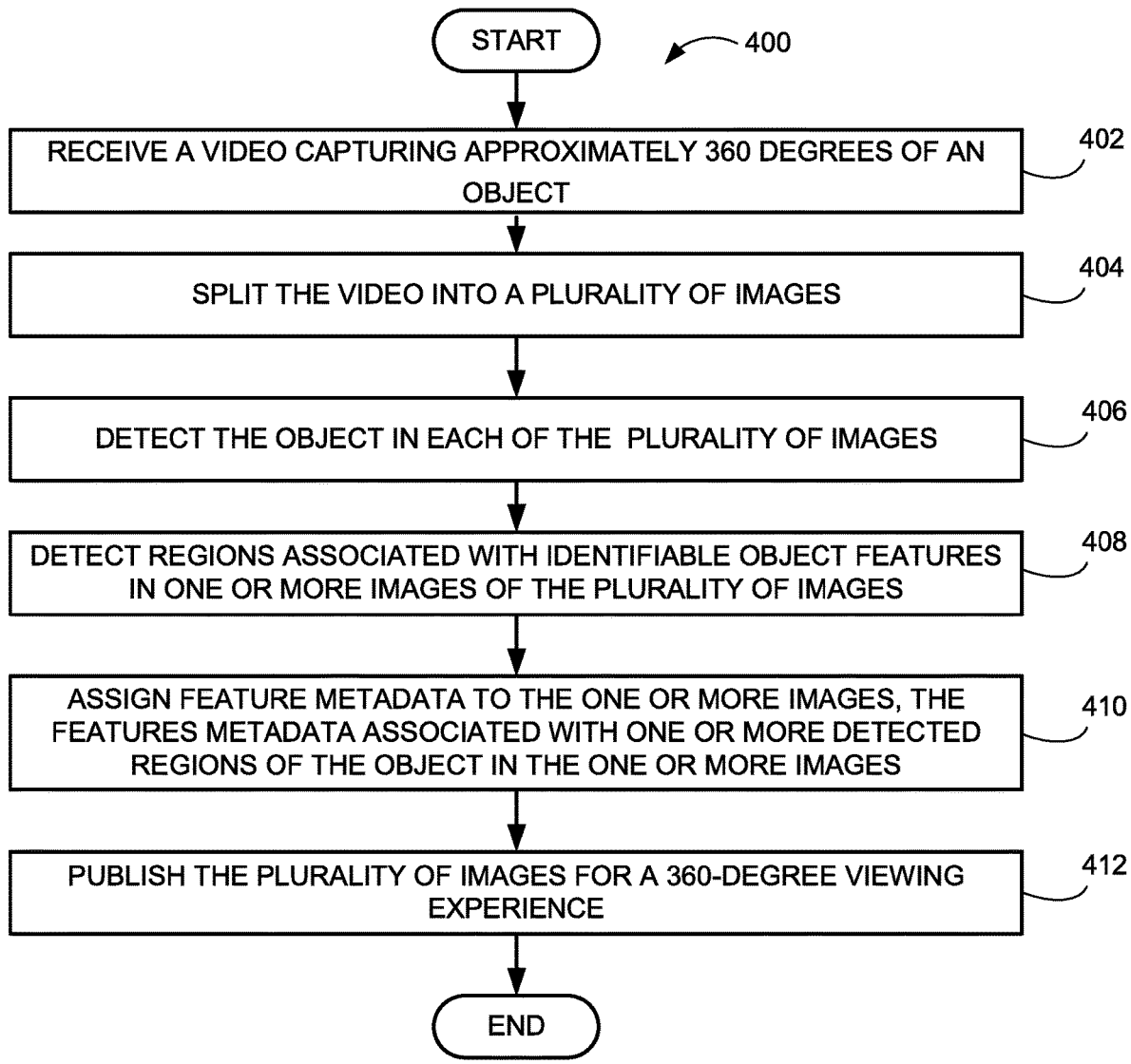
FIG. 4 is a flowchart of another exemplary method for generating a 360-degree viewing experience.

FIG. 4 is a flowchart of an exemplary method 400 for generating a 360-degree viewing experience. The method 400 is similar to the method 300 except that method 400 includes receiving a video and splitting the video into a plurality of images rather than receiving a plurality of images. Steps 406, 408, 410, and 412 are similar if not identical to steps 304, 306, 308, and 310. Thus, while steps 402 and 404 are described below, the description of steps 406, 408, 410, and 412 are omitted for brevity because the descriptions of steps 304, 306, 308, and 310 are incorporated herein. However, steps 402 and 404 are described below.

In step 402 of method 400, the system (e.g., system 100 or, more specifically, the server terminal 120, the user terminal 130, the staging terminal 150, or combinations thereof) may receive a video capturing approximately 360 degrees of an object. In some embodiments, the object (e.g., a vehicle) may be placed on a carousel that rotates the object about a vertical axis 360 degrees. As the object spins a certain number of degrees (e.g., 6 degrees), the image capture device 140 may capture a video of the object. In other embodiments, the image capture device 140 may capture an image every time the spins with the carousel a certain number of degrees, thereby capturing a plurality of images (e.g., 60 images) of the object. The system (e.g., staging terminal 150) may stitch together the plurality of images to form a video, which is then received by the server terminal 120 for processing.

In step 404, the system (e.g., system 100 or, more specifically, the server terminal 120, the user terminal 130, the staging terminal 150, or combinations thereof) may split the video into a plurality of images.

Figure 5:
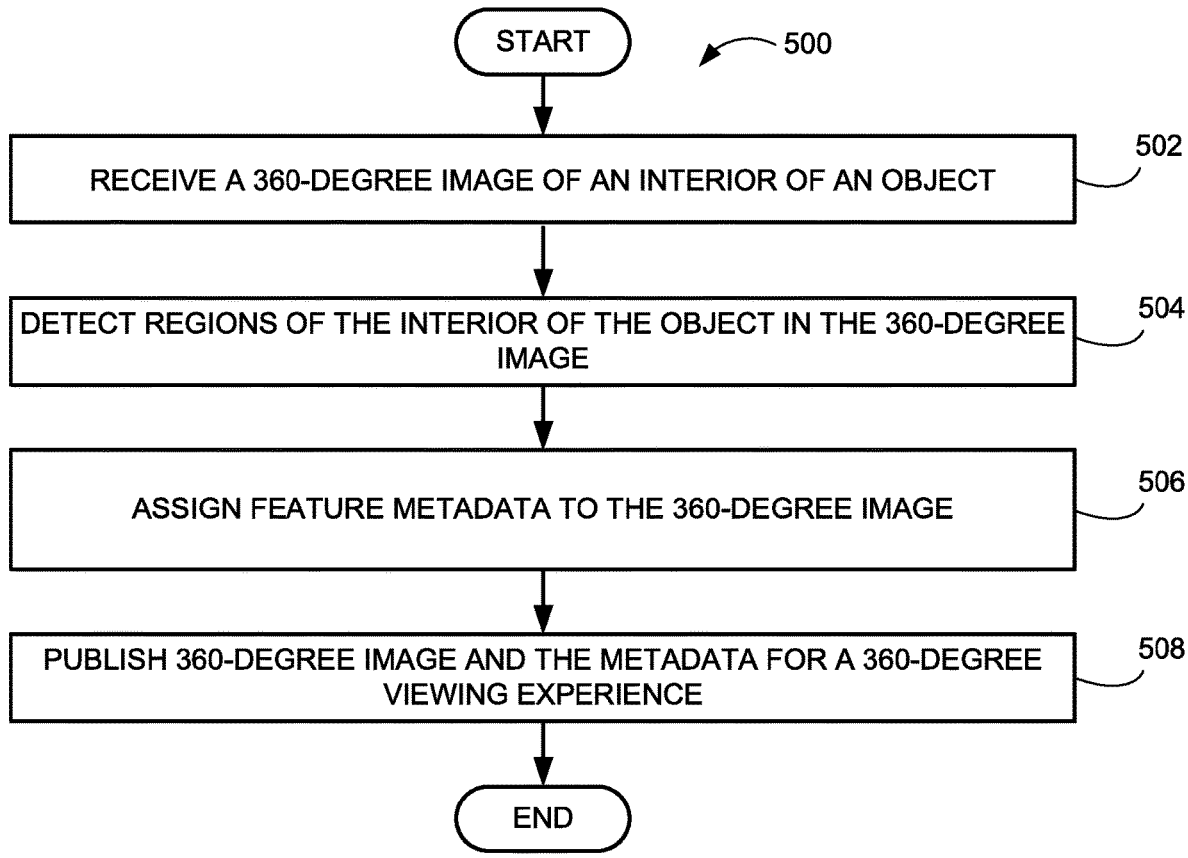
FIG. 5 is a flowchart for a further exemplary method for generating a 360-degree viewing experience.

FIG. 5 is a flowchart of an exemplary method 500 for generating a 360-degree viewing experience. The steps of method 500 are described below.

In step 502 of method 500, (e.g., system 100 or, more specifically, the server terminal 120, the user terminal 130, the staging terminal 150, or combinations thereof) may receive a 360-degree image of an interior of an object. In some embodiments, the 360-degree image may be formed by stitching together a plurality of images (e.g., two images (e.g., two 180-degree images), four images, six images) on an interior of an object by an image capture device (e.g., a camera with two 180-degree lenses). Essentially, the system 100 receives two or more images, identifies the common features between the two or more images, and stiches the two or more images together based on the common features in the two or more images to form a 360-degree image.

In step 504, the system (e.g., system 100 or, more specifically, the server terminal 120, the user terminal 130, the staging terminal 150, or combinations thereof) may detect the regions of the interior of the object in the 360-degree image. To do so, the system may utilize a second machine learning model, which may be different form the first machine learning model. The second machine learning model may include a You Only Look Once (YOLO) image segmentation model (e.g., YOLOv2).

In step 506, the system (e.g., system 100 or, more specifically, the server terminal 120, the user terminal 130, the staging terminal 150, or combinations thereof) may assign metadata to one or more detected regions of the interior of the object in the 360-degree image. The metadata may include a region label (e.g., "new tires") and coordinates associated with the one or more detected regions.

In step 508, the system (e.g., system 100 or, more specifically, the server terminal 120, the user terminal 130, the staging terminal 150, or combinations thereof) may publish the 360-degree image for the 360-degree viewing experience.

Next, the application discusses an example end result of the above described process according to FIGS. 3, 4, and 5.

Figure 6A:
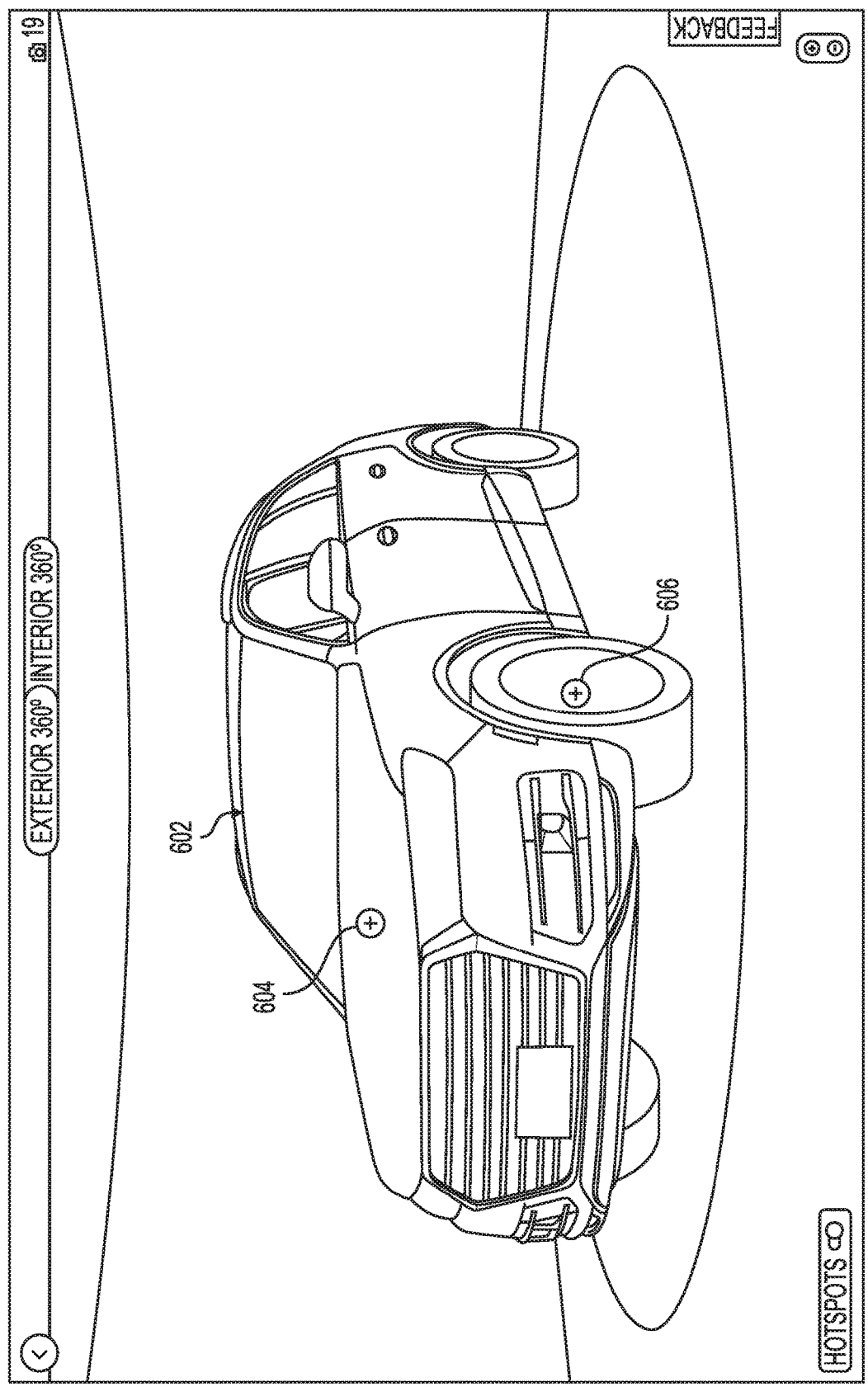
FIG. 6A is a diagram depicting a first image of an object with two visual indicators.
Figure 6B:
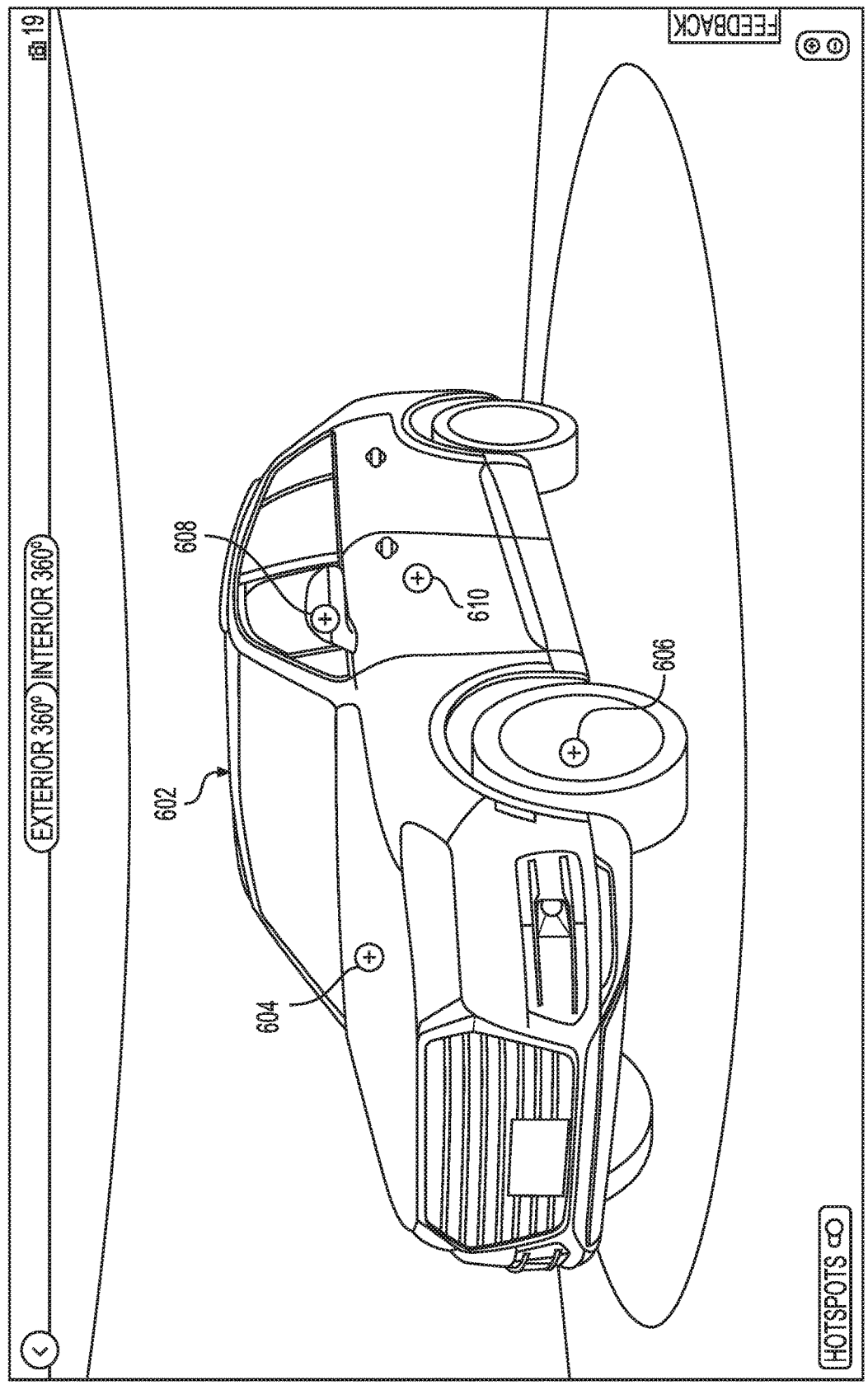
FIG. 6B is a diagram depicting a second image of an object with four visual indicators.

FIG. 6A is a diagram depicting a first image of an object with two visual indicators as displayed by the viewer from a user device. FIG. 6B is a diagram depicting a second image of an object with four visual indicators as displayed by the viewer from a user device. Together, these two images show part of the 360-degree viewing experience. In particular, the object (e.g., vehicle 602) is rotated approximately six degrees between the two images. FIG. 6A only illustrates two visual indicators (604, 606), while FIG. 6B illustrates the same two visual indicators (604, 606) along with two more visual indicators (608, 610). Visual indicator 604 is displayed on the hood of the vehicle 602, visual indicator 606 is displayed on the wheel of the vehicle 602, visual indicator 610 is displayed on the driver side door of the vehicle 602, and visual indicator 608 is displayed on the driver side mirror of the vehicle 602.

Figure 6D:
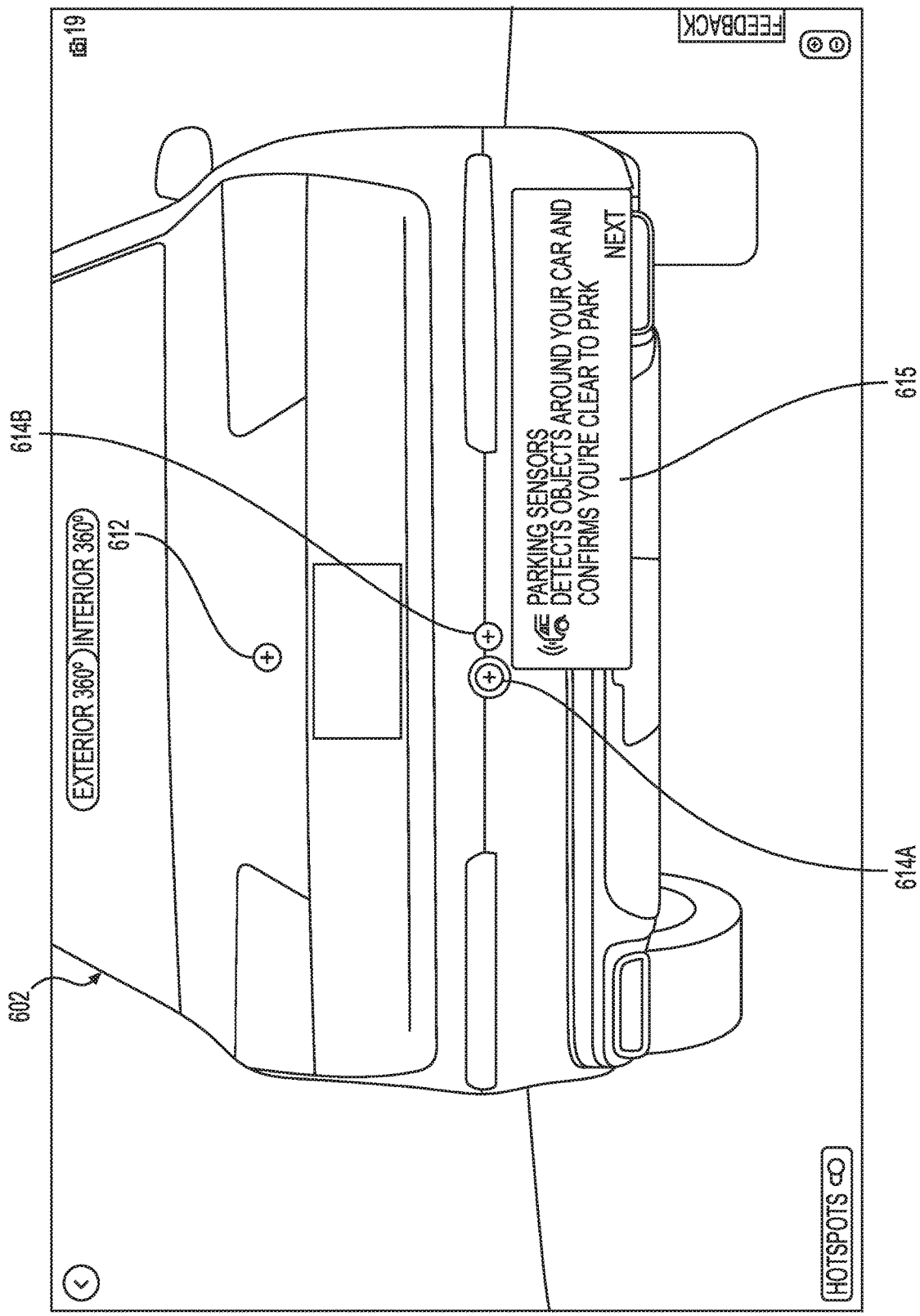
FIG. 6D is a diagram depicting the third image of the object with the visual indicator indicating more than one feature selected.

FIG. 6C is a diagram depicting a third image of the object with a visual indicator including an indicator to more than one feature. FIG. 6D is a diagram depicting the third image of the object with one visual indicator selected. Together, these images illustrate the use of a visual indicator including an indicator to more than one feature. As shown in FIG. 6C, visual indicator 612 of vehicle 602 only indicate one feature (e.g. power liftgate) by using a plus sign in the center of a blue circle. However, visual indicator 614 indicates more than one feature (e.g., parking sensors and a tow hitch) by using an indicator that designates more than one feature. Thus, the visual indicator 614 displays the number 2 inside a blue circle to indicate that two features are present at that location. As shown in FIGS. 6C and 6D, when the system (e.g., the user terminal 130) receives input to select visual indicator 614, the system may cause the visual indicator 614 to transform into two visual indicators (614A, 614B) each corresponding to a particular feature of the vehicle 602. As shown, once visual indicator 614 is selected via user input, the system may display details of a particular feature corresponding to the first transformed visual indicator 614A. For example, the system may display a feature title such as "Parking Sensors" along with a description about the feature title.

Referring to the description above with respect to FIG. 3, the system (e.g., the user terminal 130) may generate a visual indicator indicating more than one feature when the system determines that (i) two or more labels from the feature metadata are associated with a detected region, (ii) the two or more region labels match two or more corresponding features on the features list beyond a threshold level, and (iii) the two or more corresponding features match high value corresponding high value features beyond the threshold level.

The system of the disclosed technology may be useful in a retail operation. For example, in a network of automobile dealerships, various dealer locations will receive new automobile inventory through trade-ins, purchases from customers, or wholesale purchases. A dealer location may be responsible for intaking information about a particular automobile purchased by the dealership. In addition to capturing the vehicle's information (e.g., make, model, year, condition), the dealership may be responsible for taking a series of photos that represent that automobile for eventual distribution to a larger network, such as through the dealership's website. It is advantageous for to display images of a vehicle from all angles and to call out certain important features to aid consumers in their decision-making process about purchasing the vehicle. However, manual generation of 360-viewing experiences with labeled features (e.g., hot spots) is cumbersome and labor intensive to do for every vehicle for a network of automobile dealerships. The system of the disclosed technology can assist in automatically generating and publishing data for a 360-degree viewing experience that can be accessed by a user terminal using a custom viewer to display the 360-degree viewing experience with hot spots.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that embodiments or aspects of the disclosed technology may be practiced without these specific details. In other instances, well-known methods, structures and techniques have not been shown in detail in order not to obscure an understanding of this description. References to "one embodiment," "an embodiment," "example embodiment," "various embodiment," "some embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiment of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating a 360-degree viewing experience, comprising:
   one or more processors; and
   a memory in communication with the one or more processors and storing instructions that, when executed by the one or more processors, are configured to cause the system to:
   receive a plurality of images of an object from an image capture device, wherein each of the plurality of images corresponds to a different rotational orientation of the object relative to the image capture device;
   detect, using a first machine learning model, the object in each of the plurality of images;
   detect, using a second machine learning model, regions associated with identifiable object features in one or more images of the plurality of images;
   assign feature metadata to the one or more images, the feature metadata associated with one or more detected regions of the detected regions of the object in the one or more images of the plurality of images; and
   publish, with an application programming interface, the plurality of images and the feature metadata for the 360-degree viewing experience.

2. The system of claim 1, wherein the first machine learning model comprises a first single shot detector (SSD), a first Faster Region-Based Convolutional Neural Network (Faster R-CNN), a Region-Based Fully Convolutional Net (R-FCN), a Mask R-CNN, SegNET, a pixel-wise contextual attention network (PiCANet), or a combination thereof, wherein the second machine learning model comprises a You Look Only Once image segmentation model (YOLO), YOLO version 2 (YOLOv2), YOLO9000, RetinaNET, a second Mask R-CNN, a second SSD, or a combination thereof, and wherein the object is a vehicle.

3. The system of claim 1, wherein the feature metadata comprises at least one region label and coordinates associated with the one or more detected regions.

4. The system of claim 3, wherein the instructions, when executed by the one or more processors, are further configured to cause the system to:
receive a feature list of the object; and
determine whether a first region label associated with the one or more detected regions matches a first feature on the feature list beyond a threshold level.

5. The system of claim 4, wherein the instructions, when executed by the one or more processors, are further configured to cause the system to:
receive a list of high value features;
determine whether the first feature matches a first high value feature from the list of high value features beyond the threshold level;
responsive to determining that the first region label matches the first feature beyond the threshold level and responsive to determining that the first feature matches the first high value feature beyond the threshold level, generate a visual indicator to be displayed at a center of the detected region based on the coordinates; and
responsive to determining that the first region label does not match the first feature beyond the threshold level or that the first feature does not match the first high value feature beyond the threshold level, refrain from generating the visual indicator for display.

6. The system of claim 5, wherein generating the visual indicator comprises (i) determining that a series of images of the plurality of images each comprise a common first region, (ii) performing a regression analysis on a center of the common first region in each of the series of images, (iii) updating the coordinates corresponding to the visual indicator for each of the series of images based on the regression analysis; and (iv) generating the visual indicator for display in each of the series of images at a location based on the updated coordinates.

7. The system of claim 6, wherein the instructions, when executed by the one or more processors, are further configured to cause the system to:
load the plurality of images and the visual indicator; and
display the plurality of images sequentially to give the appearance of the object rotating about an axis along with the visual indicator.

8. The system of claim 7, wherein the instructions, when executed by the one or more processors, are further configured to cause the system to:
crop each of the plurality of images based on detecting the object,
wherein the displaying of the plurality of images with the visual indicator and the generation of the visual indicator occurs substantially simultaneously.

9. The system of claim 1, wherein the object is rotated into a first rotational orientation position, a second rotational orientation position, and a third rotational orientation position with respect to the image capture device, and wherein the image capture device captures a first image at the first rotational orientation position, a second image at the second rotational orientation position, and a third image at the third rotational orientation position.

10. A system for generating a 360-degree viewing experience, comprising:

one or more processors; and
a memory in communication with the one or more processors and storing instructions that, when executed by the one or more processors, are configured to cause the system to:
receive a video capturing approximately 360 degrees of an object;
split the video into a plurality of images;
detect, using a first machine learning model, the object in each of the plurality of images;
detect, using a second machine learning model, regions associated with identifiable object features in one or more images of the plurality of images;
assign feature metadata to the one or more images, the feature metadata associated with one or more detected regions of the object in the one or more images of the plurality of images; and
publish, with an application programming interface, the plurality of images and the feature metadata for the 360-degree viewing experience.

11. The system of claim 10, wherein the first machine learning model comprises a first single shot detector (SSD), a first Faster Region-Based Convolutional Neural Network (Faster R-CNN), a Region-Based Fully Convolutional Net (R-FCN), a Mask R-CNN, SegNET, a pixel-wise contextual attention network (PiCANet), or a combination thereof, wherein the second machine learning model comprises a You Look Only Once image segmentation model (YOLO), YOLO version 2 (YOLOv2), YOLO9000, RetinaNET, a second Mask R-CNN, a second SSD, or a combination thereof, and wherein the object is a vehicle.

12. The system of claim 10, wherein the feature metadata comprises at least one region label and coordinates associated with the one or more detected regions.

13. The system of claim 12, wherein the instructions, when executed by the one or more processors, are further configured to cause the system to:
receive a feature list of the object;
receive a list of high value features;
determine whether a first region label assigned to the one or more detected regions matches a first feature on the feature list beyond a threshold level;
determine whether the first feature matches a first high value feature from the list of high value features beyond the threshold level;
responsive to determining that the first region label matches the first feature beyond the threshold level and responsive to determining that the first feature matches the first high value feature beyond the threshold level, generate a visual indicator for display at a center of the detected region based on the coordinates; and
responsive to determining that the first region label does not match the first feature beyond the threshold level or that the first feature does not match the first high value feature beyond the threshold level, refrain from generating the visual indicator for display.

14. The system of claim 13, wherein generating the visual indicator comprises (i) determining that a series of images of the plurality of images each comprise a common first region, (ii) performing a regression analysis on a center of the common first region in each of the series of images, (iii) updating the coordinates corresponding to the visual indicator for each of the series of images based on the regression analysis; and (iv) generating the visual indicator for display in each of the series of images at a location based on the updated coordinates.

15. The system of claim 14, wherein the instructions, when executed by the one or more processors, are further configured to cause the system to load the plurality of images and the visual indicator.

16. The system of claim 15, wherein the instructions, when executed by the one or more processors, are further configured to cause the system to display the plurality of images sequentially to give the appearance of the object rotating about an axis along with the visual indicator.

17. A system for generating a 360-degree viewing experience of an interior of an object, comprising:
   one or more processors; and
   a memory in communication with the one or more processors and storing instructions that, when executed by the one or more processors, are configured to cause the system to:
      receive a 360-degree image of the interior of the object;
      detect, using a machine learning model, regions associated with identifiable object features in the 360-degree image;
      assign feature metadata to the 360-degree image, the feature metadata associated with one or more detected regions of the interior of the object in the 360-degree image; and
      publish, with an application programming interface, the 360-degree image and the feature metadata for the 360-degree viewing experience.

18. The system of claim 17, wherein:
   the 360-degree image is formed by stitching together two or more images captured by an image capture device of the interior of the object, and
   the feature metadata comprises at least one region label and Cartesian coordinates associated with the one or more detected regions.

19. The system of claim 17, wherein the instructions, when executed by the one or more processors, are further configured to cause the system to:
   receive a feature list of the object;
   receive a list of high value features;
   determine whether a first detected region of the one or more detected regions matches a first feature on the feature list beyond a threshold level;
   determine whether the first feature matches a first high value feature from the list of high value features beyond the threshold level;
   responsive to determining that the first detected region matches the first feature beyond the threshold level and responsive to determining that the first feature matches the first high value feature beyond the threshold level, translate the Cartesian coordinates of a center of the detected region to polar coordinates and generate a visual indicator for display at the center of the detected region based on the polar coordinates; and
   responsive to determining that the first detected region does not match the first feature beyond the threshold level or that the first feature does not match the first high value feature beyond the threshold level, refrain from generating the visual indicator for display.

20. The system of claim 19, the instructions, when executed by the one or more processors, are further configured to cause the system to stretch the 360-degree image into a spherical view.

* * * * *